United States Patent
Deinet

[15] 3,683,067
[45] Aug. 8, 1972

[54] METHOD OF CONTROLLING FUNGI WITH 2-ACETOXY BENZONITRILES

[72] Inventor: Adolph J. Deinet, Woodcliff Lake, N.J.

[73] Assignee: Tenneco Chemicals, Inc.

[22] Filed: June 26, 1970

[21] Appl. No.: 50,319

Related U.S. Application Data

[63] Continuation-in-part of Ser. No. 791,484, Jan. 15, 1969, abandoned.

[52] U.S. Cl...................................424/78, 424/304
[51] Int. Cl. ...............................................A61l 13/00
[58] Field of Search.............424/78, 304; 260/465 D

[56] References Cited

UNITED STATES PATENTS

| | | | |
|---|---|---|---|
| 3,214,279 | 10/1965 | Scott | 424/78 |
| 3,214,280 | 10/1965 | Taylor | 424/89 |
| 3,227,563 | 1/1966 | Fahlstrom | 424/78 |
| 3,308,082 | 3/1967 | Pauli et al. | 424/78 |
| 3,329,702 | 7/1967 | Rohr | 424/304 |

OTHER PUBLICATIONS

Carpenter et al., Chemical Abstracts 63:13958c (1965)
Cooke et al., Chemical Abstracts 62:12382g (1965)
Shell, Chemical Abstracts 59:6320b (1963)

*Primary Examiner*—Albert T. Meyers
*Assistant Examiner*—Norman A. Drezin
*Attorney*—Daniel J. Reardon, Barry G. Magidoff, George E. Lilly and Evelyn Berlow

[57] ABSTRACT

2-Acyloxybromobenzonitriles are used to protect surface-coating compositions from deterioration resulting from attack by fungi and other microorganisms.

4 Claims, No Drawings

METHOD OF CONTROLLING FUNGI WITH 2-ACETOXY BENZONITRILES

This is a continuation-in-part of my copending application Ser. No. 791,484, which was filed on Jan. 15, 1969 which has been abandoned.

This invention relates to surface-coating compositions. More particularly, it relates to surface-coating compositions containing 2-acyloxybromobenzonitriles that have improved resistance to deterioration resulting from attack by fungi and other microorganisms.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi. Others, for example, aqueous dispersions of water-insoluble synthetic linear polymers, generally contain as plasticizers and as thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack. Various biocidal materials have been suggested for use in surface-coating compositions, but none has proven entirely satisfactory in this application. Some do not provide the required prolonged protection against attack by microorganisms, while others undergo sulfide staining, and still others tend to separate from the applied coating by migration, volatilization, or leaching once the coating has been spread in a thin layer on the surface to be protected.

This invention relates to surface-coating compositions that contain a new class of biocides. These biocides, which are thoroughly compatible with the resinous binders that are commonly used in surface-coating compositions and which are resistant to sulfide staining, provide excellent and prolonged resistance to deterioration resulting from attack by fungi, bacteria, and other microorganisms without adversely affecting the color, viscosity, and other physical properties of the surface-coating compositions.

The biocidal compounds that are used in the surface-coating compositions may be represented by the structural formula

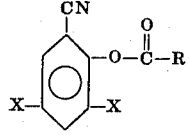

wherein R represents an alkyl group having from one to three carbon atoms, one of the X substituents represents bromine, and the other X substituent represents either bromine or hydrogen. Illustrative of these compounds are the following: 2-acetoxy-3-bromobenzonitrile, 2-acetoxy-5-bromobenzonitrile, 2-acetoxy-3,5-dibromobenzonitrile, 2-propionoxy-3-bromobenzonitrile, 2-propionoxy-3,5-dibromobenzonitrile, 2-butyroxy-3,5-dibromobenzonitrile, and the like.

The biocidal compounds may be prepared by any suitable and convenient procedure. For example, they may be prepared by the reaction of the appropriate bromosalicylaldoxime with a stoichiometric excess of a lower alkanoic acid anhydride.

The 2-acyloxybromobenzonitriles of this invention can be used to impart fungal and bacterial resistance to a wide variety of surface-coating compositions including both organic solvent-based and water-based coating systems. They are particularly valuable as biocides in coatings that contain as their resinous binder either an oleoresinous material or a water-insoluble synthetic linear addition polymer.

In a preferred embodiment of the invention a 2-acyloxybromobenzonitrile is used as the biocide in an organic solvent-based system that contains an oleoresinous binder. Suitable oleoresinous binders include drying oils, such as linseed oil, tung oil, soybean oil, dehydrated castor oil, safflower oil, or fish oil; bodied drying oils; blends of drying oils or bodied drying oils with a resin component, such as limed rosin, ester gum, or phenolic resin; oleoresinous varnishes formed by heating one of the aforementioned resins with one or more drying oils or bodied drying oils; and alkyd resins, which are resinous products resulting from the reaction of a polyhydric alcohol, such as pentaerythritol or glycerol, with a dicarboxylic acid, such as phthalic anhydride, and fatty acids.

In another preferred embodiment of the invention, a 2-acyloxybromobenzonitrile is used in aqueous dispersions that contain about 10 to 60 percent by weight of a water-insoluble resinous binder that is an oleoresinous binder as hereinbefore defined and/or a synthetic linear addition binder. The aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acids esters of alcohols having one to eight carbon atoms with vinyl acetate, vinyl chloride, acrylonitrile, or styrene; copolymers of acrylic acid esters of alcohols having one to eight carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of the 2-acyloxybromobenzonitrile need be present in the surface-coating compositions. As little as 0.10 percent of the biocide, based on the weight of the composition, will bring about an appreciable improvement in the resistance of the composition to attack by microorganisms. Approximately 5.0 percent or more of the biocide, based on the weight of the composition, can be used, but these larger amounts generally do not provide further improvement in the properties of the surface-coating compositions and for this reason are not ordinarily used. While the amount of the biocide that will provide optimum protection for the surface-coating compositions depends upon such factors as the choice of 2-acyloxybromobenzonitrile, the choice of resinous binder and other components of the composition, the amount of each that is employed, and the application for which the coating composition is intended, in most cases about 0.25 to 2.0 percent of the biocide, based on the weight of the surface-coating composition, is used.

In addition to the resinous binder and the biocide, the surface-coating compositions of the present invention may contain various auxiliary materials, such as pigments, extenders, solvents, dyes, defoaming agents, driers, emulsifying agents, dispersing agents, plasticizers, other fungicides, bactericides, and corrosion inhibitors, in the amounts ordinarily used for these purposes.

The 2-acyloxybromobenzonitrile that is used as the biocide may be incorporated into the surface-coating composition by any convenient procedure. For example, it can be combined with the pigments and various other components to form a pigment phase that is then mixed with the resinous binder and water or an organic solvent to form the surface coating composition. Alternatively, it can be added to a composition that contains the resinous binder, pigment, and water or organic solvent. The biocidal compound can be added as such to the other components of the surface-coating composition, or it can be added as a solution of the biocidal compound in a solvent, such as an alcohol, ether, or ketone.

The invention is further illustrated by the examples that follow.

EXAMPLE 1

A mixture of 50 grams (0.17 mole) of 3,5-dibromosalicylaldoxime and 500 grams of acetic anhydride was heated at its reflux temperature for 2.5 hours. It was then cooled to 30° C. and poured into 2.5 liters of water. After being stirred for 3 hours, the reaction mixture was filtered and the solid product was washed with 500 grams of water and dried. There was obtained 53 grams (98.2 percent yield) of crude 2-acetoxy-3,5-dibromobenzonitrile that melted at 65°–70° C. Upon recrystallization from 650 ml. of petroleum ether, there was obtained 26.5 grams of purified 2-acetoxy-3,5-dibromobenzonitrile, a white crystalline solid that melted at 76°–79° C. and contained 48.0 percent of bromine (calculated, 49.9 percent of bromine).

EXAMPLE 2

Using the procedure described in Example 1, 2-acetoxy-5-bromobenzonitrile was prepared from 5-bromosalicylaldoxime and acetic anhydride. The 2-acetoxy-5-bromobenzonitrile, which melted at 55° C., contained 32.4 percent of bromine (calculated, 33.3 percent of bromine).

EXAMPLE 3

A polyvinyl acetate emulsion paint was prepared by mixing together the following materials:

| | Parts by Weight |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| Aqueous solution containing 55% by weight of polyvinyl acetate | 350 |

To samples of this paint were added the amounts of 2-acetoxy-3,5-dibromobenzonitrile indicated in Table I. For comparative purposes, samples were prepared that contained either phenylmercuric acetate or benzene in place of the test compound.

The following standard testing procedure was used: Pieces of drawdown paper were dipped into each of the treated paints, dried for 24 hours, and again dipped into the paint and dried. The coated paper samples were cut into 1 ¼-inch squares. Each of the coated paper squares thus prepared was placed on a plate of malt and mycophil agar, which had previously been inoculated with 1 ml. of a suspension of the test organism. The plates, prepared in triplicate, were incubated at 28° C. and observed weekly. The growth was estimated according to the following key, and the results of the replicate plates were averaged:

ZO = Zone of inhibition in mm.
O = No zone of inhibition

The results obtained are summarized in Table I.

TABLE I

| Fungicide | 2-Acetoxy-3,5-Dibromobenzonitrile | | Phenylmercuric Acetate | | Benzene | |
|---|---|---|---|---|---|---|
| % Fungicide | 2% | 1% | 2% | 1% | 2% | 1% |
| Pullularia pullulans | ZO–9 | ZO–5 | ZO–21 | ZO–17 | 0 | 0 |
| Penicillium crustosum | ZO–11 | ZO–2 | ZO–12 | ZO–10 | 0 | 0 |
| Aspergillus niger | ZO–16 | XO–16 | XO–11 | ZO–10 | 0 | 0 |

EXAMPLE 4

To samples of the polyvinyl acetate emulsion paint whose preparation was described in Example 3 were added 2 percent by weight of a fungicide. Pieces of drawdown paper were dipped into each of the treated paints, dried for 24 hours, and again dipped into the paint. After a 24 hour drying period, one of the samples coated with each of the treated paints was leached for 24 hours in accordance with Method 5831, CCC-T-1916. The coated paper samples were cut into 1 ¼ inch squares, which were evaluated by the procedure described in Example 3.

The results obtained are summarized in Table II. In this table
ZO = Zone of inhibition in mm.
O = No growth
1–10 = Increasing amounts of growth
* = Weeks of incubation at 20° C. and 90 percent relative humidity
** = Phenylmercuric Acetate
*** = Dow 1013
**** = Vancide PA

TABLE II

| Product of Ex. 1 | Commercial Fungicide A** | Fungicide Commercial Fungicide B*** | Commercial Fungicide C**** | None |
|---|---|---|---|---|

P.pullulans

| | | | | | |
|---|---|---|---|---|---|
| Unleached | | | | | |
| 1 Week* | 0 | 0 | ZO-6 | 0 | 10 |
| 2 Weeks | 0 | 0 | ZO-6 | 0 | 10 |
| 4 Weeks | 0 | 0 | ZO-4 | 0 | 10 |
| Leached | | | | | |
| 1 Week* | 1 | 0 | ZO-2 | 0 | 10 |
| 2 Weeks | 1 | 0 | ZO-1 | 0 | 10 |
| 4 Weeks | 1 | 0 | ZO-1 | 1 | 10 |
| A.niger | | | | | |
| Unleached | | | | | |
| 1 Week* | ZO-2 | ZO-13 | 0 | 0 | 10 |
| 2 Weeks | 0 | ZO-8 | 0 | 2 | 10 |
| 4 Weeks | 0 | ZO-8 | 0 | 2 | 10 |
| Leached | | | | | |
| 1 Week* | 0 | ZO-9 | 0 | 0 | 10 |
| 2 Weeks | 0 | ZO-6 | 0 | 2 | 10 |
| 4 Weeks | 2 | ZO-6 | 0 | 6 | 10 |

From the data in Tables I and II it will be seen that 2-acetoxy-3,5-dibromobenzonitrile is an effective biocide for paints since it imparted to the paints resistance to attack by fungi which was maintained even after leaching. Unlike those containing phenylmercuric acetate, the paint films containing the biocidal compound of this invention did not undergo any black or gray staining when they were exposed to hydrogen sulfide.

Each of the other 2-acyloxybromobenzonitriles disclosed herein also has biocidal properties that make it useful in many industrial and agricultural applications.

The terms and expressions that have been used are used as terms of description and not of limitation. There is no intention in the use of such terms and expressions of excluding any equivalents of the features shown and described or portions thereof. It is recognized that various modifications are possible within the scope of the invention claimed.

What is claimed is:

1. A method of protecting a surface from fungal attack comprising applying to said surface a fungicidal amount of a composition containing 0.1 percent to 5.0 percent, based on the weight of said composition, of a fungicidal compound having the formula

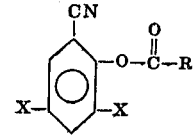

wherein R represents an alkyl group having from one to three carbon atoms, one of the X substituents represents bromine, and the other X substituent represents bromine or hydrogen and a water insoluble resinous binder selected from the group consisting of drying oils; oleoresinous varnishes; alkyd resins; polyvinyl acetate, polyvinyl butyrate; polyvinyl chloride; copolymers of vinyl acetate with vinyl chloride or acrylonitrile; copolymers of vinyl chloride with acrylonitrile or vinylidene chloride; polyethylene; polyisobutylene; polystyrene; copolymers of styrene with acrylonitrile; copolymers of methacrylic and acrylic acid esters of alcohols having one to eight carbon atoms with vinyl acetate, vinyl chloride, acrylonitrile, styrene or acrylic acid; and mixtures thereof.

2. The method of claim 1 wherein the fungicidal compound is present in a concentration of 0.25 to 2.0 percent.

3. The method of claim 1 wherein the fungicidal compound is 2-acetoxy-3,5-dibromobenzonitrile.

4. The method of claim 1 wherein the resinous binder is polyvinyl acetate.

* * * * *